United States Patent
Ganguli et al.

[11] Patent Number: 6,117,469
[45] Date of Patent: *Sep. 12, 2000

[54] FLAVORING FOOD COMPOSITIONS

[75] Inventors: Keshab Lal Ganguli; Cornelis Hofman; Anton Reid Van Immerseel; Karel Petrus Van Putte, all of Vlaardingen, Netherlands

[73] Assignee: Lipton, division of Conopco, Inc., Englewood Cliffs, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/980,952

[22] Filed: Dec. 1, 1997

[30] Foreign Application Priority Data

Nov. 29, 1996 [EP] European Pat. Off. .............. 96203375

[51] Int. Cl.⁷ .................................. A23F 3/00; A23D 7/00
[52] U.S. Cl. ......................... 426/387; 426/474; 426/475; 426/613
[58] Field of Search ..................... 426/475, 474, 426/387, 613

[56] References Cited

U.S. PATENT DOCUMENTS 2,641,550  6/1953  Dykstra et al. .

FOREIGN PATENT DOCUMENTS

| 396481 A1 | 7/1990 | European Pat. Off. . |
| 0475573 | 3/1992 | European Pat. Off. . |
| 6-125707 | 10/1994 | Japan ...................................... 426/613 |
| 94/15479 | 7/1994 | WIPO . |
| 97/03566 | 2/1997 | WIPO . |

OTHER PUBLICATIONS

European Search Report application No. EP 97/20,3458 dated Mar. 12, 1998.

European Search Report application No. EP 96/20,3375 dated Apr. 23, 1997.

*Primary Examiner*—Anthony J. Weier
*Attorney, Agent, or Firm*—Edward A. Squillante, Jr.

[57] ABSTRACT

An olive oil flavor is imparted to a bland triglyceride oil by conducting an inert gas through olive oil, the flavor donating oil, and subsequently through a preferably cooler receptor triglyceride oil in which the olive oil flavor substance is absorbed. In order to prevent off-flavor formation the temperature of the donor oil is restricted to 0°–65° C.

10 Claims, 1 Drawing Sheet

FLAVORING FOOD COMPOSITIONS

The present invention concerns a flavouring process for food compositions, particularly triglyceride oils, using a gas as carrier for flavour transfer and the products of such process.

STATE OF THE ART

Triglyceride oils when used for the preparation of food often have to be purified by a thorough refining treatment. Effective refining removes not only any off-flavour, but inevitably also the native flavour of the oil. However, some triglyceride oils, so called flavour oils, are appreciated for their native flavour. A widely used flavour oil is olive oil, particularly virgin olive oil. The flavour of virgin olive oil is so strong that even when this oil is diluted with several volumes of refined tasteless olive oil a blend is obtained, so called pure olive oil, which still possesses a rich olive oil taste. However, most cooking oils are derived from sunflower oil, rapeseed oil and soybean oil. These refined oils have good frying properties, but lack any taste of their own. An attractive flavour can be imparted to these oils by blending with some olive oil. Such blends, although not denoted as olive oil, may receive such high organoleptical appreciation that they can be used as a relatively cheap substitute of olive oil. But for the preparation of such blends substantial amounts of expensive olive oil are needed. The use of cheap and flavour-rich, but unrefined Lampante oil is not allowed.

EP 475 573 describes an alternative process for donating to a bland refined vegetable oil the flavour of a donor oil. An inert gas stream when sparged through a donor oil heated at >65° C. gets loaded with flavours which the gas releases from the oil. When the flavoured gas stream is conducted subsequently through a relatively cool receptor oil, the flavour load is deposited in the receptor oil. The final effect is that a transfer of flavours from donor to acceptor oil is realized without any mixing of the involved oils.

A donor oil which is proposed for the process of EP 475 573, but not exemplified is olive oil. However, the process when reproduced with olive oil fails. The obtained flavour effect is unsatisfactory, not to say bad. The receptor oil contains so much off-flavour that it has to be rejected for consumption.

STATEMENT OF INVENTION

The present invention is based on the discovery that inadequate results of the prior art process when applied to olive oil must be ascribed to the unexpectedly high temperature sensitivity of the olive oil flavour.

According to the invention a process is provided for transferring flavour from olive oil to a receptor triglyceride oil which consists in conducting an inert gas first through the flavour donating olive oil and then through the receptor oil, characterized in that the temperature of the donor oil is maintained at a relatively low temperature in the range from 0° C. up to but not including 65° C.

The receptor oil may be any triglyceride oil, including an olive oil.

The invention is a general method for flavouring food compositions which is equally applicable to other flavour sources which can act as donor substance and other flavour substances which can act as receiving substance. The invention is further based on the insight that the flavour donor substance does not need to be substantially heated in order to have released the flavour components when conducting the carrier gas through it. The slower release caused by the relatively low temperature of the present process appears to be sufficiently compensated by lowering the gas pressure over the source substance and/or extending the process time.

The further description discusses use of the invention for the transfer of olive oil flavour to a triglyceride oil, which is a preferred embodiment. But the invention is equally applicable to similar food flavouring processes where gas is used for flavour transfer and where equally the prior art process is not adequate. When the cause is a not acknowledged temperature sensitivity, application of the moderate temperature of the present process might appear to be decisive for the success of the flavour transfer.

DETAILS OF THE INVENTION

Figure 1:
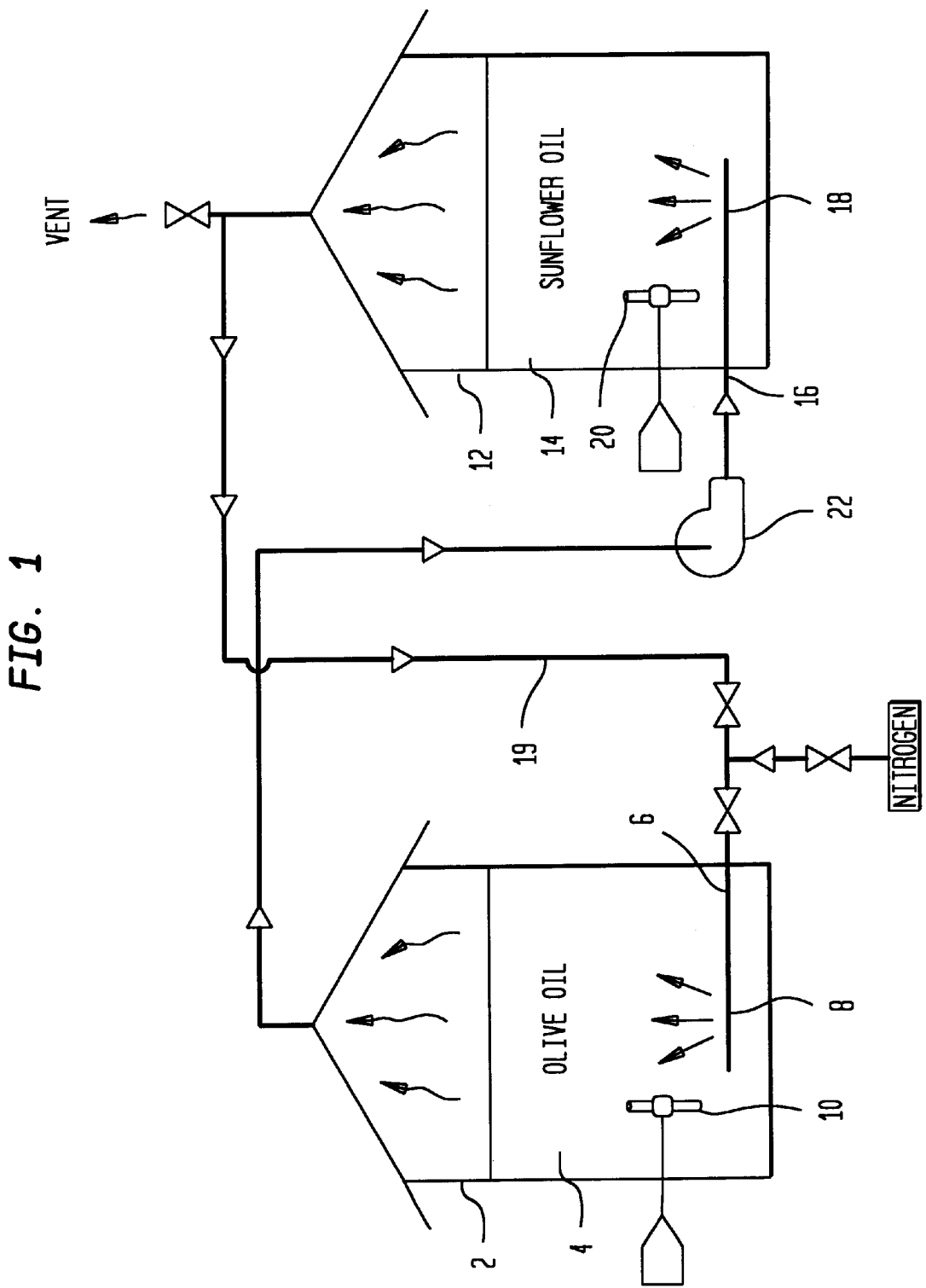
FIG. 1 shows a schematic view of equipment which is suitable for carrying out the invention. Two vessels, the left one containing the donor olive oil, the right one containing the receptor triglyceride oil are connected by pipes through which the flavour carrier gas is conducted.

The temperature of the donor oil should be from 0° C. up to but not including 65° C. and preferably it is chosen from the range 10°–60° C. A proper choice of the donor and acceptor oil temperature and the temperature difference between both oils is a powerful tool for controlling the transfer of the flavour to the acceptor oil. The temperatures of both oils may be the same, but preferably the acceptor oil is cooler, the difference being preferably 5°–50° C., more preferably 40°–50° C.

For the acceptor oil a suitable temperature is 20° C.

In order to prevent harmful over-heating of the donor oil any heat fed to the donor oil must be quickly distributed through the whole oil volume.

To this aim the transferring gas suitably is sparged through the donor oil, optionally in combination with stirring the oil, which affords a good heat distribution through the bulk of the oil and transfer of flavour from the donor oil to the carrier gas.

The nature of the invention requires that the flavour donating substance and the flavour receiving substance are liquid at the temperature of the process of the invention. The flavour receiving substance is a food composition, either suited for immediate consumption or used as an ingredient for further processing to a food product.

The flavour transferring carrier gas should be inert and is therefore at least oxygen-free. A preferred carrier gas is nitrogen. The donor oil is sparged with the carrier gas, preferably under reduced pressure. The pressures over the donor oil and over the recipient oil often are different. Some trial will easily deliver a suitable combination of conditions.

All types of olive oils can be used as donor oil such as extra virgin, virgin, fine, semi-fine and Lampante, except fully refined olive oil. Unrefined Lampante oil often is a suitable and even preferred flavour source, which therefore is used as a relatively cheap donor oil and preferred over expensive virgin olive oil, while the flavouring results hardly differ for both oils.

FIG. 1 gives a schematic view of equipment which is suitable for carrying out the invention. It basically consists of two vessels or tanks of which (02) contains the donor oil (04) and (12) the acceptor oil (14). Nitrogen gas conducted via a pipe (06) and through a sparking head (08) is bubbling through the olive oil. A pump (22) presses the flavour carrying nitrogen gas subsequently via pipe (16) to a second sparking head (18) into the acceptor oil. Pipe (19) is utilized for optional recycling of the carrier gas. Impellers (10) and (20) support the intensive contact between oil and carrier gas.

Both vessels may be equipped with a heat exchanging facility (not shown), the vessel (02) with a heater, the vessel (12) with a cooler.

The time needed for completing the flavour transfer depends on the concentration of the flavour in the transfer gas which is determined by the actual temperature of the donor oil and the flavour concentration in the oil. In order to reduce flavour escape from the receptor oil its temperature is relatively low, suitably 20° C. or less.

On account of the relatively low temperatures applied in the present invention, generally several hours are needed for completing the process. The more volatile flavour components will be transferred first, followed by the less volatile ingredients.

The proper time for stopping the process can be determined e.g. by tasting samples of the receptor oil, optionally after proper dilution.

For economy reasons the transfer gas optionally is recycled. Recirculation also prevents loss of flavour components which are carried with the gas leaving the acceptor oil.

The acceptor oil preferably is employed as a flavour concentrate in which the flavour is accumulated. This means that more flavour is condensed in the oil than is necessary for direct use of the oil. The eventual desired taste is obtained by diluting the concentrate with a less or not flavoured triglyceride oil. Use of such flavour concentrate enables easy storage and transport of flavour in a relatively small volume of oil. The volume of the oil to be flavoured suitably varies from e.g. 0.5 to 20 times the volume of the concentrate oil, but even dilutions with 130 parts of oil have delivered a satisfactorily flavoured oil.

The product of the invention preferably is a triglyceride oil. As an effect of the flavouring process such oil is characterized by some flavour components present in a typical ratio. The donor oil contains the common volatile aldehydes hexanal and nonanal in a concentration ratio less than 1.

The transfer gas will release from the donor oil relatively more hexanal than the less volatile nonanal. The eventual effect is that the receptor oil which originally contains no substantial amount of both aldehydes will eventually contain both hexanal and nonanal in a weight ratio which is greater than 1, anyway substantially higher than in the donor oil.

Although common blending of triglyceride oils with olive oil will also add said aldehydes to the target oil, such blending operation will not increase the ratio of aldehydes as present in the original olive oil.

Part of the invention therefore is a flavoured triglyceride oil which contains hexanal and nonanal in a weight ratio hexanal/nonanal greater than 1, preferably greater than 2.

A characteristic but undesired component of the olive oil flavour palette is 2T4T-decadienal (2-trans-4-trans-decadienal). The decomposition which occurs when olive oil is exposed to temperatures higher than 65° C. causes an increase of this compound. But, since the process of the invention is carried out below 65° C., relatively little of such off-flavour compound is formed and transferred to the acceptor oil. At temperatures above 65° C., such as 80° C., the situation changes dramatically. Table II shows that with increasing donor oil temperature the 2T4T concentration increases much faster than the hexanal concentration. Triglyceride oils flavoured by the instant low temperature process contain relatively little 2T4T-decadienal and the hexanal/2T4T-decadienal ratio characteristically is >3, preferably >4. Such triglyceride oils form part of the invention.

The invention provides a vegetable oil which possesses besides the good frying properties for which such oils are selected, also the much appreciated flavour of olive oil.

The invention is also applicable to processes for flavour transfer where the involved substances are not triglyceride oils. The donor substance may be a triglyceride oil and the receptor substance a food composition containing an aqueous phase. The principle of the invention is not limited to the presence of triglyceride oils.

The invention is exemplified by the following examples:

EXAMPLE 1

A 5 liter vessel was loaded with 1900 g of virgin olive oil and a second 2.5 liter vessel with 720 g of fully refined sunflower oil. The vessels were connected by a gas pipe as shown in FIG. 1. The vessel containing the donor oil was kept at 60° C. and at a pressure of 60 mbar. Temperature and pressure in the vessel containing the acceptor oil were maintained at 20° C. and 1100 mbar, respectively. A nitrogen flow of 0.20 m3 per kg donor oil was conducted for 4 hours first through the donor oil and then through the acceptor oil.

The obtained sunflower oil had a concentration flavour which was too high for direct use and first had to be diluted with 0.5 times its volume of untreated sunflower oil.

A tasting panel (n=10) evaluated the flavoured sunflower oil and has assigned a high score ("excellent") for flavour quality.

EXAMPLE 2

Example 1 was repeated with 7440 g of Lampante olive oil and 1833 g of fully refined sunflower oil.

A nitrogen flow of 0.5 m3 per kg donor oil was conducted for 4.5 hours consecutively through both oils.

The flavour quality assessment of the tasting panel (n=10) who evaluated the flavoured oil reads "very well".

TABLE I

| Donor oil | | Flavoured Oil | |
| --- | --- | --- | --- |
| | | hexanal/nonanal ratio | |
| Olive oil | before | 40° C. | 60° C. |
| I Extra virgin | 0.66 | 9 | 4 |
| II Fine | 0.68 | 10 | 4 |
| III Semi-fine | 0.41 | 6 | 3 |
| IV Lampante I | 0.88 | 12 | 4 |
| V Lampante II | 0.52 | 7 | 3 |

EXAMPLE 3

The process of example 1 was repeated with 1,1 kg of several types of donor olive oil as specified in Tables I and II and 1 kg of a fully refined tasteless sunflower oil which was the acceptor oil. The flavour was transferred by 0.034 kg nitrogen per hour.

The process was carried out successively with donor oils having temperatures of 40°, 60° and 80° C. The contents of hexanal, nonanal and 2T,4T-decadienal were established by gas chromatography.

From the tables it is apparent that the ratios of the indicated transferred compounds hexanal, nonanal and 2T4T-decadienal in the acceptor oil and in the donor oil are much different and are dependent on the temperature of the donor oil, particularly when the off-flavour compound 2T,4T-decadienal is involved.

EXAMPLE 4

One kg of Lampante oil was stripped with nitrogen gas under conditions as indicated in Table III. Three different Lampante oils have been used: A, B and C and two stripping temperatures 60° C. and 80° C.

Nitrogen was recirculated for economy reasons. Although the amount of negative taste compounds increases by recirculation, when the oil is stripped at 60° C. a satisfactory product is obtained (oil B (3)).

When the stripping temperature is raised over 65° C., decomposition occurs with a quick increase of negative taste compounds predominantly consisting of saturated and unsaturated aldehydes (including 2T,4T-decadienal).

TABLE II

| Donor oil | | Flavoured oil | | |
|---|---|---|---|---|
| | | hexanal/2T4T ratio | | |
| Olive Oil | before | 40° C. | 60° C. | 80° C. |
| I Extra virgin | 2.87 | 88 | 36 | 13 |
| II Fine | 2.27 | 70 | 29 | 11 |
| III Semi-fine | 1.9 | 59 | 24 | 9 |
| IV Lampante I | 1.2 | 37 | 15 | 6 |
| V Lampante II | 0.17 | 5 | 2 | 1 |

2T4T = 2-trans,4-trans-decadienal

EXAMPLE 5

A very low quality (6.12% free fatty acids) Lampante oil was sparged with nitrogen under conditions as indicated in Table IV. The receptor oil was a fine virgin olive oil. A small amount of each of the obtained flavour concentrates A, B and C was admixed (1.2 wt. %) with a bland base oil consisting of a mixture of sunflower oil (72 wt. %), soybeanoil (17 wt. %) and grapeseed oil (4 wt. %), The flavoured blends were assessed by a panel to possess a very fine olive oil taste which could hardly be distinguished from real olive oil.

TABLE III

| Lampante donor oil | concentration (ppb) negative taste comp. in receptor oil | | Taste |
|---|---|---|---|
| (see note) | 60° C. | 80° C. | Assesment |
| Oil A (1) | 5304 | | nice, nearly as virgin olive oil |
| Oil B (2) | | 15685 | hars/rancid |

TABLE III-continued

| Lampante donor oil | concentration (ppb) negative taste comp. in receptor oil | | Taste |
|---|---|---|---|
| (see note) | 60° C. | 80° C. | Assesment |
| Oil B (3) | 6080 | | Good, no off-taste |
| Oil B (4) | | 23306 | rancid |
| Oil C (5) | | 19946 | off-taste |

Notes:
(1) 0.332 $m^3N_2$/kg donor oil during 10 hours.
(2) 0.387 $m^3N_2$/kg donor oil during 10.5 hours.
(3) 0.28 $m^3N_2$/kg donor oil during 8.5 hours, $N_2$ recirc.
(4) 0.42 $m^3N_2$/kg donor oil during 10 hours, $N_2$ recirc.
(5) 0.42 $m^3N_2$/kg donor oil during 10 hours, $N_2$ recirc.

TABLE IV

| Donor Lampante oil 60° C. 500 mbar (kg) | Receptor fine virgin olive oil 1000 mbar 45° C. (kg) | $m^3N_2$ per kg donor oil (recycling) mode) | Sparging time (hours) | Olive oil flavour concentrate |
|---|---|---|---|---|
| 1500 | 500 | 0.24 | 9 | A |
| 1500 | 1000 | 0.48 | 18 | B |
| 1500 | 1500 | 0.72 | 27 | C |

What is claimed is:

1. A process for flavouring food compositions by transferring flavour from a flavour donating substance to a flavour receiving substance which comprises first conducting an inert gas first through the flavour donating substance and then conducting it through the flavour receiving substance, where the temperature of the donor substance is maintained at a temperature chosen from the range from about 10° C. to about 60° C. or about 0° C. to about 40° C.

2. The process according to claim 1, where the donor substance is chosen from the group of triglyceride oils.

3. The process according to claim 1, where the donor substance is an olive oil.

4. The process according to claim 3, where the olive oil is Lampante oil.

5. The process according to claim 1, where said flavour receiving substance is chosen from the group of triglyceride oils.

6. The process according to claim 1, where the temperature difference between donor substance and receptor substance is 5°–50° C.

7. The process according to claim 1, where the temperature difference between donor substance and receptor substance is 40°–50° C.

8. Process according to claim 1, where the donor oil is sparged with said inert gas under reduced pressure.

9. The process according to claim 1, wherein said inert gas is nitrogen.

10. The process according to claim 1, wherein the temperature of the donor substance is about 60° C. and it is at a pressure of about 60 mbar and wherein said inert gas is nitrogen at a flow of about 0.20 meters cubed per kg donor oil through the donor and then through the acceptor oil.

* * * * *